United States Patent
Shastry et al.

(10) Patent No.: US 7,597,752 B2
(45) Date of Patent: Oct. 6, 2009

(54) EDIBLE INKS FOR INK-JET PRINTING ON EDIBLE SUBSTRATES

(75) Inventors: Arun V. Shastry, Neshanic Station, NJ (US); Thomas M. Collins, Nazareth, PA (US); James M. Suttle, East Stroudsburg, PA (US); Neil A. Willcocks, Fullerton, CA (US); Eyal Ben-Yoseph, Stroudsburg, PA (US); Megan Walters, Woodbury, CT (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 10/606,417

(22) Filed: Jun. 26, 2003

(65) Prior Publication Data

US 2004/0086603 A1    May 6, 2004

Related U.S. Application Data

(60) Provisional application No. 60/392,303, filed on Jun. 26, 2002, provisional application No. 60/453,117, filed on Mar. 7, 2003.

(51) Int. Cl.
*C09D 11/02* (2006.01)
*A23G 3/00* (2006.01)
*G01D 11/00* (2006.01)

(52) U.S. Cl. ............ 106/31.29; 347/100; 426/104
(58) Field of Classification Search ........... 106/31.29, 106/31.61; 347/100; 426/104
See application file for complete search history.

(56) References Cited

U.S. PATENT DOCUMENTS

| | | | |
|---|---|---|---|
| 3,052,552 A | 9/1962 | Koerner et al. | |
| 3,694,237 A | 9/1972 | Piotrowski | |
| 4,168,662 A | 9/1979 | Fell | |
| 4,390,369 A | 6/1983 | Merritt et al. | |
| 4,670,271 A | 6/1987 | Pasternak | |
| 4,835,208 A | 5/1989 | Ball | |
| 5,006,362 A | 4/1991 | Hilborn | |
| 5,021,802 A | 6/1991 | Allred | |
| 5,259,873 A * | 11/1993 | Fujioka | 106/31.62 |
| 5,397,387 A | 3/1995 | Deng et al. | |
| 5,405,642 A | 4/1995 | Gilis et al. | |
| 5,409,715 A | 4/1995 | Meyers | |
| 5,435,840 A | 7/1995 | Hilborn | |
| 5,453,121 A | 9/1995 | Nicholls et al. | |
| 5,453,122 A | 9/1995 | Lyon | |
| 5,464,470 A * | 11/1995 | Brachman et al. | 106/31.08 |
| 5,466,287 A | 11/1995 | Lyon | |
| 5,637,139 A | 6/1997 | Morelos et al. | |
| 5,665,439 A | 9/1997 | Andersen et al. | |
| 5,711,791 A | 1/1998 | Croker et al. | |
| 5,800,600 A | 9/1998 | Lima-Marques et al. | |
| 5,800,601 A | 9/1998 | Zou et al. | |
| 5,938,826 A | 8/1999 | Baker et al. | |
| 6,013,122 A | 1/2000 | Klitzman et al. | |
| 6,093,239 A | 7/2000 | Baker et al. | |
| 6,113,678 A | 9/2000 | Malhotra | |
| 6,245,135 B1 | 6/2001 | Jaeger et al. | |
| 6,450,615 B2 * | 9/2002 | Kojima et al. | 347/46 |
| 6,623,553 B2 * | 9/2003 | Russell et al. | 106/31.13 |
| 2002/0114878 A1 * | 8/2002 | Ben-Yoseph et al. | 426/660 |
| 2003/0097949 A1 * | 5/2003 | Candler et al. | 101/491 |
| 2003/0101902 A1 * | 6/2003 | Reitnauer et al. | 106/31.31 |
| 2004/0021757 A1 * | 2/2004 | Shastry et al. | 347/106 |

FOREIGN PATENT DOCUMENTS

| | | |
|---|---|---|
| EP | 0 571 451 | 12/1993 |
| JP | 08-057051 | 2/1997 |
| WO | WO 92/14795 | 9/1992 |
| WO | WO 01/94116 | 12/2001 |
| WO | WO 01/94116 A2 * | 12/2001 |
| WO | WO 0194116 A2 * | 12/2001 |
| WO | WO 02/00920 | 1/2002 |
| WO | WO 03/048260 | 6/2003 |

* cited by examiner

*Primary Examiner*—Jerry Lorengo
*Assistant Examiner*—Veronica Faison Gee
(74) *Attorney, Agent, or Firm*—Fitzpatrick, Cella, Harper & Scinto

(57) ABSTRACT

High resolution ink-jet printing on edible substrates is disclosed in which fat or wax-based edible inks, which contain a colorant, a fat or wax dispersible carrier, and a fat or wax base, are used to produce high resolution images on edibles. The methods utilize a piezoelectric printhead; and the edible products include confectionery pieces having non-planar, hydrophobic surfaces, such as wax-polished sugar shell surfaces, with a printed image thereon having a resolution greater than 100 dpi, preferably greater than 300 dpi.

26 Claims, No Drawings

EDIBLE INKS FOR INK-JET PRINTING ON EDIBLE SUBSTRATES

This application claims the benefit of priority under 35 U.S.C. §119(e) to U.S. Provisional Application No. 60/392,303, filed Jun. 26, 2002, and 60/453,117, filed Mar. 7, 2003, both of which are incorporated by reference herein in their entirety.

BACKGROUND OF THE INVENTION

1. Field of the Invention

The invention is directed to fat and wax-based ink compositions for ink-jet printing on edible substrates, to methods of ink-jet printing on edibles with the inks, and to the edibles made. The inks and methods described herein may be employed for forming printed edible products as diverse as pharmaceutical pills and tablets to pet foods. However, the invention has particular utility for printing on confectionery, including, without limitation, chocolate bars and tableted products, jelly beans, toffees and chewing gums, and particularly for printing high resolution and high definition images on edible substrate surfaces that are difficult to print on using conventional technology. Such surfaces include, without limitation, the non-planar, non-porous, hydrophobic surfaces of M&M's® Milk Chocolate and Peanut Chocolate Candies, which have a sugar shell with a carnauba wax polish coating.

2. Description of the Related Art

It is known to print identifying or decorative images on edibles. The methods generally relied upon to print on small pieces of confectionery or on pharmaceuticals include rotogravure, flexography, silk screen and pad printing. Each of these methods has its own drawbacks, and each of them requires contacting the piece to be printed.

The present technology for printing on M&M's® Milk Chocolate and Peanut Chocolate Candies is by a contact printing process utilizing an offset roller, in what is referred to herein as rotogravure printing. The rotogravure system is limited in the number of colors that can be applied to a substrate. Traditionally, one color is printed, and with modifications two or three colors may be applied, but full color printing on edibles is not possible. The rotogravure roller is also limited in the surface area of a non planar piece that it can print. As with other contact methods of printing, there is a danger of the rotogravure roller crushing the edible articles being printed. Print designs cannot be changed or modified easily using the rotogravure method, because each new design must be engraved on a roller.

Silk screen and pad printing, although capable of forming reasonably high resolution and high definition images, cannot deliver the dots-per-inch (dpi) of ink jet systems. These systems are also limited in terms of the surface area of a substrate that can be printed, and in many cases these systems require a planar substrate. As with rotogravure printing, full color printing is not possible with silk screen or pad printing methods, and changeover of graphic designs is both time consuming and expensive.

Another popular method for forming images on edibles, particularly on cakes and other large substrates, involves using an edible transfer sheet which can be handled in a printer and which are relatively porous and hydrophilic and therefore can readily accept an image from a water-based ink, including an ink-jetted image. Various methods are then used to transfer the image from the sheet to an edible substrate. An exemplary ink for use with this type of system is disclosed in U.S. Patent Application Publication US 2002/0008751 and comprises water, isopropyl alcohol, sodium lauryl sulphate and FD&C colorant. In the transfer sheet technology, printing is not performed directly on the surface of an edible conveyed past a printhead. Using a transfer sheet requires a component of the substrate to partly dissolve the sheet or to allow the sheet to adhere to the substrate. Thus, the transfer sheet technology is not readily adapted to the high speed production of images on non-planar surfaces of confectionery pieces. The water-based inks adapted for use with transfer sheets do not perform properly for ink-jet printing directly on non-planar, non-porous and hydrophobic surfaces, as they adhere poorly, dry too slowly and lack opacity.

Ink-jet printing on edibles, if the technology could be perfected, would be attractive from many vantage points. It would eliminate the need to contact the edible substrate with a contact member such as a pad or roller. Further, since ink-jet printing is a non-contact printing system, slight variations in the size of edibles would not negatively impact upon printing quality, as typically occurs with pad or roller based systems. Also, an ink-jet printer image is stored as data, and not fixed on a contact member. Consequently, images could be selected, altered, transmitted, and the like, more easily than in contact printing, opening the possibility for rapid changeover of printed designs and personalized graphics.

Ink jet printing systems are broadly divided into continuous jet, and drop-on-demand (also called "impulse") systems in which droplets are generated as needed for ejection to the substrate surface for image formation. Methods of ink-jet printing on edible substrates using continuous jet technology have been disclosed. Most of these are directed to labelling and the like applications which do not require high resolution. Examples of such prior art disclosures include: U.S. Pat. Nos. 4,168,662, 5,453,122, 5,006,362, 5,397,387 and 5,800,601.

In continuous jet systems, ink is emitted in a continuous stream under pressure through at least one nozzle. The stream is broken up into droplets at a fixed distance from the orifice, typically, by a piezoelectric crystal, which is vibrated at controlled frequency adjacent to the ink stream. This function of the piezoelectric element is different from the function of the piezoelectric element in a piezojet system, where the piezoelectric element controls the generation of droplets from a reservoir. To control the flow of ink droplets in a continuous jet system, the inks are charged (by addition of salts and other conductive agents) and the droplets are passed through an electrostatic field, which adjusts the trajectory of the droplets in accordance with data signals. The droplets are either directed back to a gutter for recirculation or to a specific location on the substrate to create the desired character matrix. A typical resolution for a continuous jet printer image in an industrial setting, using a single printhead and a single pass printing is about 75-100 dpi.

Most continuous jet inks are solvent-based, containing substantial amounts of methyl ethyl ketone (MEK) or an equivalent volatile organic compound (VOC) as the carrier, with lesser amounts of water and a lower alcohol. Inks for continuous ink jet systems are also characterized by the presence of salts, such as potassium thiocyanate, or other conductivity-enhancing agent, which enables the droplets to be deflected in an electrostatic field. Typically, the conductivity of such inks is greater than about 2000 micro Siemens. Thus, the inks that have been developed for industrial continuous jet printing are not readily adapted for printing on edibles, as they typically contain non-edible, and sometimes toxic, ingredients.

Continuous jet inks also have a very narrow range of acceptable viscosity. Inks having a viscosity above about 10 centipoise (cp) at low shear rates cause the pumps in the printhead to cavitate during use. Below a viscosity of about 2 to about 3 cp, the jets are not stable. Thus most, if not all, continuous jet ink jet inks have a viscosity of about 2.8 to about 6 cp.

Of the drop-on-demand systems, the most economically important today are piezojet and bubblejet (sometimes referred to as thermal ink jet) systems. In bubblejet systems, a bubble is formed by a resistance heater in an ink reservoir. The resulting pressure wave from the bubble forces ink through an orifice plate. Once the heat is removed, the bubble collapses and a droplet is ejected. Bubblejet printheads dominate the home and office ink-jet printer markets and they are capable of very high resolution. However, several considerations limit their use in an industrial setting, particularly their use with edible substrates.

The viscosity of bubblejet inks is very low, on the order of 1.5 cp, necessary so that a bubble can form quickly upon application of minimal voltage to the resistance heater. Moreover, the ink must be capable of withstanding the temperature cycling encountered inside the printhead. Consequently, the number of inks which could be developed for printing on edibles with a bubblejet printer is extremely limited. Bubblejet printers are also much too slow to permit high speed printing directly on edible substrates.

A method of printing on edibles is described in co-pending U.S. patent application Ser. No. 09/587,108, incorporated herein by reference. The ink described therein is a pigmented white ink which has found utility for printing on chocolate.

Piezojet ink-jet systems are commercially available in which the ink undergoes a phase change from a solid state to a liquid state in the printhead. However, edible wax-based inks for such printheads are not commercially available.

Thus, there continues to be a need in the art for inks which adhere better to the known edible substrates and which at the same time have properties which render them suitable for use with existing piezojet ink-jet printheads. In particular it would be desirable to develop an ink for effective printing on hydrophobic surfaces, which cause water based inks to bead up or smear. Such inks have been developed after careful consideration of the properties desired in such inks and demanded by the physical constraints of the known printheads.

SUMMARY OF THE INVENTION

In one aspect, the invention is a fat or wax-based ink-jettable edible ink for printing on an edible substrate comprising: a colorant, a fat or wax dispersible carrier for the colorant, and a fat or wax base. The carrier and fat or wax base are selected such that the ink has a viscosity in a range of about 5 centipoise to about 20 centipoise and a surface tension of less than about 50 dynes per centimeter at the conditions under which the ink is ejected from the printhead.

In another aspect, the invention is a method for ink-jet printing on an edible substrate comprising the steps of: positioning an edible substrate proximate a piezojet ink-jet printhead having at least one ink reservoir; supplying to the ink reservoir an edible ink comprising a colorant, a fat or wax dispersible carrier for the colorant, and a fat or wax base, ejecting ink from the printhead in accordance with data signals onto a surface of the edible substrate to form an image consisting of individual solidified droplets of the ink and having a resolution greater than 100 dpi.

In a preferred embodiment, the fat or wax-based ink is a solid at room temperature and is heated while in the printhead so that it is ink-jettable. The ink solidifies on the surface to form an opaque adherent droplet of solidified ink.

In another aspect, the invention is an edible product made using the above inks and methods. The edible product comprises an edible substrate such as, without limitation, baked goods, biscuits and cakes, cookies, nuts, chocolates, cheeses, crackers and chips, pastries, puddings and mousses, ice creams and creams, petfood and pet treats, main meal snacks, cereals, and pharmaceutical tablets. An ink-jetted image is deposited on the edible substrate consisting of individual droplets of solidified edible ink and having a resolution of greater than about 100 dpi. At least one of the individual droplets comprises a fat or wax-based edible ink-jettable ink which comprises a colorant, a fat or wax dispersible carrier for the colorant, and a fat or wax base.

The most preferred edible products according to the invention are confectionery. Examples include a lentil shaped confectionery piece having a sugar shell with a wax-based finish, on which an image may be ink-jet printed using the above inks having a resolution greater than 300 dpi.

DETAILED DESCRIPTION OF THE PREFERRED EMBODIMENTS

The present invention is concerned with the industrial adaptation of piezojet drop-on-demand systems, which heretofore have not been used for printing high resolution images on edible substrates. Although the designs of the printheads differ, they are all characterized by a piezoelectric device which causes ejection of ink from a reservoir, such as by a piezoelectric crystal deforming the wall of the reservoir in accordance with data signals. As many of the inks used herein are solid at room temperature, it is frequently necessary to heat the printhead to allow droplets of the ink to be ejected from the printhead. A preferred type of piezojet ink-jet printhead, which has a heating element to effect a phase change, is available from Spectra, Incorporated located in Lebanon, N.H., USA. Thus, "ink-jettable," as used herein, means an ink which can be ejected reliably from a piezojet printhead, without requiring excessive modification of the printhead or maintenance issues. In most cases, a heating element of some type is necessary so that the fat or wax-based ink can be ejected from the printhead.

The fat or wax base of the inks according to the invention helps the ink to form opaque adherent images on edible substrates, particularly those surfaces which are hydrophobic and therefore difficult to print on using conventional water based inks. The fat or wax-based inks according to the invention include a colorant which may be a dye, pigment or a lake (which is a dye attached to a particulate substrate). One technical challenge is to ensure the dispersion of the colorant in the fat or wax base.

Suitable edible colorants include: the food dyes approved for human consumption under the Food, Drug and Cosmetic Act administered by the U.S. Food and Drug Administration (FDA), referred to herein as "FD&C dyes"; natural colorants derived from natural (usually vegetable) sources which are generally assumed to be safe for human consumption; colorants derived from natural sources which are FDA-approved; and synthetic colorants approved for use in non-U.S. jurisdictions.

As colorants in connection with the present invention, any of the known FD&C dyes may be used, including without limitation, Red No. 3 (Erythrosine), Red No. 40 (Allura Red), Yellow No. 6 (Sunset Yellow FCF), Yellow No. 5 (Tartrazine), Green No. 3 (Fast Green FCF), Blue No. 1 (Brilliant Blue FCF), Blue No. 2 (Indigotine), and mixtures thereof.

Exemplary natural colorants include, without limitation, annatto seed extract, anthocyanins (found in various berries, grapes, cabbage, and cranberries), caretenoids (found in carrots), betalins, and oleoresins (from roots such as turmeric, paprika, carmines, beet roots, and tomatoes).

As the FD&C dyes and natural colorants are water soluble, solubilizing the dyes in a carrier that is compatible with a wax poses a significant technical challenge. In certain preferred embodiments, the colorants are completely solvated in the carrier such that there are substantially no colorant solids in the ink. The substantial absence of colorant solids in this context means less than 5.0 percent by weight solids, preferably less than 1.0 percent by weight solids. Preferably, an FD&C dye is provided in the carrier in a range of about 0.5 percent by weight up to about the solubility limit of the colorant in the carrier. Practically, FD&C dye is present in the fat or wax-based ink together with the carrier in a combined amount of about 5.5 percent by weight to about 35.0 percent by weight.

Pigments and lakes may also be used as the colorant in the inks according to the invention. A pigment consists of fine, usually inorganic particles used to impart color when dispersed in the base. Examples of pigments include, without limitation, kaolin, chalk, titanium dioxide and aluminum hydroxide. A lake comprises fine particles, such as aluminum hydroxide particles bound to a colorant, such as one of the FD&C dyes or natural colorants mentioned above. Examples include, without limitation, FD&C Blue #1 Lake, FD&C Blue #2 Lake, FD&C Yellow #5 Lake, FD&C Yellow #6 Lake, Erythrosine Lake, Amaranth Lake, Ponceau 4R Lake, Carmoisine Lake and FD&C Red 40 Lake, all of which may be obtained from the Warner Jenkinson Company, St. Louis, Mo.

Where pigments or lakes are used, particles having a particle size smaller than about 50 microns should be used. A preferred particle size range is below 30 microns, and most preferably below 15 microns. For higher resolution images that require very fine droplets, the colorant particle size must be below 5 microns. For photographic quality printing, particle size below 1 micron is desired. An appropriate particle size can be obtained by high shear mixing of the pigment or lake in the carrier and the fat or wax base.

In some embodiments where a pigment or lake is used, it is useful to process the lakes or pigments by ball milling to particle sizes below about 1 micron, making these colorants suitable for use in fat based inks which can be ink-jetted.

The inks according to the invention include a fat or wax base. "Fat" as used herein includes both fats and oils, either of which may be saturated or unsaturated, and may include substituted and unsubstituted hydrocarbon chains. Fat also includes "fat-like" substances such as limonenes and terpenes, and also includes lipids. "Wax" generally refers to edible waxes such as carnauba wax, bees wax, and candelilla wax, which are substantially solid at room temperature. A combination of waxes may also be used. In embodiments, the fat base comprises a mixture of a fat and one or more oils. "Oils" is defined to mean fats that are liquid at room temperature.

The preferred wax base material undergoes a phase change from a liquid state to a solid state upon contacting the substrate surface. By undergoing phase change, the fats provide certain properties to the inks such as opacity, good adhesion to the substrate, and good surface chemistry for printing onto hydrophobic substrate surfaces, and the ability to print onto non porous surfaces.

Suitable fats and waxes that can be used to make the edible inks are candelilla wax, carnauba wax, bees wax, hydrogenated vegetable fats, milk fat, cocoa butter, edible fractions of mono-, di- and triglycerides and their derivatives, fats commercially available under the brand name Captex® 300 brand triglyceride, and vegetable oils. Colorant, which is either a dye dissolved in a carrier or a pigment or lake dispersed in a carrier, is mixed with the continuous fat or wax phase in a high shear mixer, such as a Silverson mixer. The setting or solidifying of the fat or wax-based ink on the edible substrate surface is a phase transition from the liquid state to the solid state. It is generally preferable to avoid combined fat systems and eutectics; and ideally (in the case of fat based systems) a non-polymorphic fat system is used to ensure optimal setting characteristics for the ink.

The colorant is dissolved or dispersed in a carrier, which is then dispersed into the fat or wax phase. Preferably, colorant is added to the carrier in an amount close to the solubility limit of the carrier for the solvent. The preferred carrier system for FD&C dyes is based on one or more polyols, such as propylene glycol or glycerol. Other fat dispersible carriers include vegetable oils, carbohydrate solutions, sugar solutions and corn syrups. It is also contemplated that the colorants can also be dispersed into water or other polar solvents prior to dispersing into the fat phase. The important characteristics of the carrier system are that it be able to disperse or dissolve the colorant and that it be compatible with the fat phase. Preferably FD&C colorant is soluble in the carrier at least to the extent of 1 gram per 100 ml, more preferably greater than 5 grams per 100 ml and most preferably greater than about 18 grams per 100 ml. Polyols have a good balance of fat-compatibility and solubility for most of the colorants.

Surfactants and/or emulsifiers may be used in the ink formulation to provide a uniform and stable dispersion of the colorant and colorant carrier into the fat phase. Some materials that can be used for aiding the dispersions are commercially available from Quest International, The Netherlands, including the following: monoglycerides available under the tradename Myverol; acetylated monoglycerides available under the tradename Myvacet; citrogylcerides available under the tradename Admul Citrem; polysorbates available under the tradename Tween; sodium stearol lactylate available under the tradename Admul SSL; and sorbitan monostearate available under the tradename Span.

Antifungal/antimicrobial agents such as Polysorbate 80 may be used in amounts preferably less than about 1.0 percent by weight. Alternative antimicrobials include, without limitation, parabens, methyl parabens, benzoates, propionates. Which may be used in amounts prescribed by regulation.

Antifoam agents include, without limitation, simethicone emulsion, coconut oil, alcohols, and surfactants. Suitable antifoam agents may be selected from among those commercially available by one of ordinary skill and are used in the composition according to the invention in a range of about 0.1 percent by weight to about 0.5 percent by weight.

The amount of surfactant and/or emulsifier is preferably in a range of about 0.1 percent by weight to about 5 percent by weight, preferably about 0.5 percent by weight to about 2 percent by weight, and optimally about 0.7 percent by weight to about 1.5 percent by weight.

Preservatives, flavorants, aromatics, micro-nutrients and vitamins may all be added in customary amounts to improve the attributes of the finished confectionery.

Wax-based inks contain surface chemistry that is compatible with candies having a wax-based coating, such as M&M's® Milk Chocolate and Peanut Chocolate Candies. These inks are ejected from the printhead in the liquid phase and they solidify on the edible substrate surface, allowing them to perform well on both hydrophilic and hydrophobic surfaces. The inks set to a solid state, adhere to the substrate surface and provide good image quality. This property allows for printing on many other food surfaces in addition to confectionery having a hydrophobic surface, including for example, potato chips, chocolates, cereals, cookies, crackers, nuts, and hard candies.

"Non-conductive" as used herein means a formulation that is not sufficiently conductive that droplets of the ink can have their trajectory manipulated by the electric field of a continuous jet printer to form an image on a substrate. Non conductive generally means an ink formulation is not continuous-jet ink-jettable. This characteristic is consistent with the substantial absence of added conductivity-enhancing salts. In addition to not being required in a drop-on-demand system, these salts can have deleterious effects on the printhead components, such as corrosion. Preferred inks according to the invention are characterized by the substantial absence of conductivity enhancing salts.

To consistently print high resolution images with piezojet systems on nonporous and hydrophobic surfaces, an ink system should have a viscosity in the range of about 5 to about 20 centipoise. Preferably the ink system exhibits a viscosity in a range of about 7 to about 15 cP. In the most preferred embodiments, the inks exhibit a viscosity in a range of about 10 to about 15 centipoise. These viscosities refer to the properties of the ink when the ink is ejected from the printhead. The temperature required to obtain these viscosities will vary depending on the composition of the inks. A typical operating temperature range for a phase-change drop-on-demand piezojet printhead is about 63° C. to about 180° C. The viscosity of melted bees wax at 120° C. is 9.8 centipoise. The viscosity of melted candelilla wax at 120° C. is 11.3 centipoise.

Ink composition and operating temperature may be varied to obtain the desired viscosity. The data in Table 1 show the effect of temperature and of the relative amount of wax and fat in various compositions.

TABLE 1

| Wax-Fat Mixture (carnauba wax: cocoa butter) | Temp. (° C.) | Viscosity (cp) |
|---|---|---|
| 90:10 | 80 | 19.5 |
| 90:10 | 85 | 19.0 |
| 90:10 | 90 | 18.4 |
| 90:10 | 95 | 16.5 |
| 90:10 | 100 | 15.5 |
| 90:10 | 105 | 14.0 |
| 80:20 | 90 | 20.5 |
| 80:20 | 95 | 16.4 |
| 80:20 | 100 | 15.2 |
| 80:20 | 105 | 13.0 |
| 50:50 | 82.3 | 33.3 |
| 50:50 | 86.6 | 23.9 |
| 50:50 | 90.3 | 21.9 |
| 50:50 | 94.7 | 19.6 |
| 100:0 | 85 | 36.4 |
| 100:0 | 93.7 | 33.6 |
| 100:0 | 98.7 | 29.1 |

Ink Composition Examples

In this disclosure, all weight percentages are given with respect to the ink formulation at the conditions at which the ink is ejected from the printhead.

In the method of preparing the ink, the colorant is dispersed into the carrier and mixed. In some instances, it may be necessary to filter the carrier/colorant mixture. If a colorant is added at near the solubility limit of the carrier, then a 2.7 micron filter may be used to remove larger particle.

Exemplary wax and fat based ink compositions are shown in Table 2.

TABLE 2

| Example No. | Dye Type | Colorant Carrier | Amount of Dye | Vol. of Colorant Carrier | Vol. of Sat. Solution (mL) | Type of Base | Amount of Fat(g) | Carrier Density (g/mL) | Final Colorant % in Wax |
|---|---|---|---|---|---|---|---|---|---|
| 1 | Red #40 | Propylene Glycol | 6 g | 200 mL | 10 | Wax | 110 | 1.04 | 8.6 |
| 2 | Red #40 | Propylene Glycol | 6 g | 200 mL | 15 | Wax | 110 | 1.04 | 12.37 |
| 3 | Red #40 | Propylene Glycol | 6 g | 200 mL | 20 | Wax | 110 | 1.04 | 15.85 |
| 4 | Red #40 | Glycerin | 3 g | 400 mL | 20 | Wax | 110 | 1.28 | 18.87 |
| 5 | Red #40 | Glycerin | 3 g | 400 mL | 30 | Wax | 110 | 1.28 | 25.87 |
| 6 | Red #40 | Glycerin | 3 g | 400 mL | 50 | Wax | 110 | 1.28 | 36.78 |
| 7 | Red #3 | Propylene Glycol | 30 g | 300 mL | 30 | Wax | 110 | 1.04 | 22.03 |
| 8 | Red #3 | Propylene Glycol | 30 g | 300 mL | 50 | Wax | 110 | 1.04 | 32.01 |
| 9 | Yellow Blend | Propylene Glycol | 4.4 g | 400 mL | 10 | Wax | 110 | 1.04 | 8.607 |
| 10 | Yellow Blend | Propylene Glycol | 4.4 g | 400 mL | 15 | Wax | 110 | 1.04 | 12.37 |
| 11 | Yellow Blend | Propylene Glycol | 4.4 g | 400 mL | 20 | Wax | 110 | 1.04 | 15.85 |
| 12 | Yellow Blend | Propylene Glycol | 4.4 g | 400 mL | 30 | Wax | 110 | 1.04 | 22.03 |
| 13 | Yellow Blend | Propylene Glycol | 4.4 g | 400 mL | 50 | Wax | 110 | 1.04 | 32.01 |
| 14 | Blue #1 | Propylene Glycol | 30 g | 300 mL | 30 | Wax | 110 | 1.04 | 22.03 |
| 15 | Blue #1 | Propylene Glycol | 30 g | 300 mL | 50 | Wax | 110 | 1.04 | 32.01 |
| 16 | Green #3 | Propylene Glycol | 40 g | 400 mL | 10 | Wax | 110 | 1.04 | 8.607 |

TABLE 2-continued

| Example No. | Dye Type | Colorant Carrier | Amount of Dye | Vol. of Colorant Carrier | Vol. of Sat. Solution (mL) | Type of Base | Amount of Fat(g) | Carrier Density (g/mL) | Final Colorant % in Wax |
|---|---|---|---|---|---|---|---|---|---|
| 17 | Green #3 | Propylene Glycol | 40 g | 400 mL | 15 | Wax | 110 | 1.04 | 12.37 |
| 18 | Green #3 | Propylene Glycol | 40 g | 400 mL | 20 | Wax | 110 | 1.04 | 15.85 |
| 19 | Red Lake | Glycerin | 5 g | 100.13 g | 30 | Wax | 108 | 1.28 | 26.22 |
| 20 | Red #3/TiO$_2$ | Propylene Glycol | 30 g | 400 mL | 30 mL each | Wax | 167 | 1.04 | |
| 21 | Red Lake | Propylene Glycol | 5 g | 100.12 g | 30 | Wax | 110 | 1.04 | 22.03 |
| 22 | Red #3/Tween | Propylene Glycol | 30 g | 400 mL | | Wax | 110 | 1.04 | 22.59 |
| 23 | Annatto 406 | NA | 30 mL | NA | 30 | Wax | 114 | | |
| 24 | Annatto 406/TiO$_2$ | NA | 10 mL | NA | 30 with TiO$_2$ | Wax | 122 | | |
| 25 | Annatto 3190 | Wesson Oil | 40 mL | 215 g | 30 | Wax | 109 | | |
| 26 | TiO$_2$ | Oil Base | | | 30 | Wax | 109.6 | | |
| 27 | Green #3 | Propylene Glycol | 40 g | 400 mL | 30 | Cocoa Butter | 301.3 | 1.04 | 9.35 |
| 28 | Green #3 | Propylene Glycol | 40 g | 400 mL | 30 | Wesson ® Oil | 299.9 | 1.04 | 9.39 |
| 29 | Green #3 | Propylene Glycol | 40 g | 400 mL | 30 | Butter | 303.3 | 1.04 | 9.29 |
| 30 | Green #3 | Propylene Glycol | 40 g | 400 mL | 30 | Butinol | 303.4 | 1.04 | 9.29 |
| 31 | Green #3 | Propylene Glycol | 40 g | 400 mL | 30 | | 300.9 | 1.04 | 9.36 |
| 32 | Green #3 | Propylene Glycol | 40 g | 400 mL | 30 | | 275 | 1.04 | 10.15 |
| 33 | Green #3 | Propylene Glycol | 40 g | 400 mL | 30 | Captex ® 300 | 301.1 | 1.04 | 9.35 |

Ink and Ink Image Properties

Compatibility with a surface may be determined by a variety of methods. For example, a smaller contact angle made by the ink droplet on the surface is consistent with better compatibility and adhesion of the ink for the substrate. The contact angle is ideally less than about 50 degrees.

Surface tension is also an indication of the compatibility of the ink with the edible substrate surface. Preferably the surface tension of the inks according to the invention, under the conditions at which the inks are ejected from the printhead, is less than about 55 dynes/cm, more preferably below about 50 dynes/cm, even more preferably below about 40 dynes/cm, and most preferably below 35 dynes/cm. The surface tension of the inks in Examples 1, 3, 5 and 6 in Table 2 above was measured with a De Nuoy ring surface tensionometer, and found to be 32.7 dynes/cm, 32.6 dynes/cm, 33.0 dynes/cm, and 33.1 dynes/cm respectively. All of these values fall within the most preferred range.

Another measure of image quality is referred to herein as adhesion. To determine the image adhesion, an aluminum block is designed with a cavity to hold a confectionery piece. The piece to be tested is essentially identical to an M&M's® Milk Chocolate Candies piece, having a white sugar shell with a carnauba wax coating. The printed piece is placed with the image facing upwards. An 8.5 inches (21.6 cm) long paper piece is placed on top of the candy piece such that the paper sits directly on top of the printed image. The paper used is Xerox® brand 4024 type copier paper. Another block with a groove to follow the curvature of the candy piece is placed on top of the candy piece, and aligned with the bottom block by two pins. A weight of 1 lb (454 g) is placed on top of the upper metal block, and the paper piece is pulled across the "image" portion of the candy piece. The length of the paper that is moved across the candy piece is 7.5 inches (19.1 cm) under the 1 lb (454 g) weight.

The image is a large "m" printed with red ink. The image is analyzed for overall brightness using a Minolta CM-3500d spectrophotometer. The medium aperture sample holder is used for the analysis. As the candy pieces are white, a higher brightness value means that the some of the image is lost during the abrasion of the paper under the weight. A brightness measure "L" is made before and after the test described above. A high difference in brightness before and after the test ("ΔL") corresponds to poor image adhesion.

It is preferred to use wax-based inks which result in image adhesion ("ΔL") less than about 5, more preferably less than about 4, even more preferably less than about 2 and most preferably less than about 1. Representative values are shown in Table 3.

TABLE 3

| | ΔL | Std. Deviation |
|---|---|---|
| Wax-based Ink | 0.5 | 0.5 |
| Comparative Example (Rotogravure printed in water/solvent ink) | 6 | 1.5 |

Resolution for an ink-jet printer may be defined by the density of solidified droplets making up an image. Continuous jet systems are typically capable of achieving resolution of about 75 to about 100 dpi. In the context of the present invention, less than about 100 dpi is considered low resolution and greater than about 100 dpi is defined as high resolution. Among the printheads capable of producing high resolution images, low end piezojet systems are typically capable of resolution in the range of about 100 dpi to about 150 dpi, which is defined herein as moderately high resolution. More advanced piezojet systems, such as those available from Spectra, Incorporated, are capable of printing at 150 dpi to 300 dpi, herein defined as very high resolution which affords very good line art images, clip art images, cartoon-type images as well as text and schematic images. By optimizing printing techniques, resolution of 300 dpi to 800 dpi can be achieved, which may be termed near-photographic or photographic high resolution. Bubblejet ink-jet technology, predominantly found in the home and office printer markets, can produce images up to 1600 dpi in some cases. However, the bubblejet printheads are slow, have very small channels and require extremely low viscosity inks, which makes them unsuitable for commercial printing on edibles with a wide range of inks. An advantage of the methods according to the present invention is that they make possible confectionery products bearing images having a resolution greater than about 100 dpi, preferably greater than about 150 dpi and even more preferably greater than about 300 dpi, using a wide variety of inks. Using the technology described herein, the inventors have formed ink-jet photographic likeness of individuals on M&M's® Milk Chocolate and Peanut Chocolate Candies using printheads available from Spectra, Incorporated.

In preferred embodiments, methods according to the invention involve printing of multicolor images utilizing multicolor printheads. In preferred embodiments, a standard ink jet printhead is modified by installing a white ink reservoir and print engine where the black ink reservoir and print engine are found in a standard printhead configuration. The remaining print engines may be provided with wax-based inks in the customary colors (cyan, magenta, and yellow), in the ordinary configuration. The standard KCMY arrangement can be used, where the letters KCMY are understood to refer to white, cyan, magenta and yellow print engines, arranged in that order in the direction of print travel. Suppliers of suitable printing equipment include the aforesaid Spectra, Incorporated.

In the preferred embodiments, images in the wax-based ink are printed using a phase change ink jet system, in which the ink is jetted in the liquid phase onto an edible substrate, where it sets almost instantly to form an opaque image. The stability of the wax-based inks and their compatibility with both porous and nonporous surfaces allows for almost any edible surface to be printed using these inks. These foods include, without limitation, baked goods, biscuits and cakes, cookies, nuts, chocolates, cheeses, crackers and chips, and pastries, puddings and mousses, ice creams and creams, petfood and pet treats, main meal snacks, cereals, and pharmaceutical tablets. In particularly preferred embodiments, images are printed onto sugar shelled confections having a hydrophobic wax coating, such as M&M's® Milk Chocolate and Peanut Chocolate Candies.

In printing relatively small confectionery pieces such as M&M's® Milk Chocolate and Peanut Chocolate Candies, it is preferable to convey the pieces on a conveyor and hold them in place as they pass a stationery printhead. Generally a pocket shaped to hold the piece is sufficient to hold the pieces in place, although if necessary, a trapping mechanism or vacuum may be utilized to keep the pieces in registration. The conveyor may be a drum with pockets or an endless belt with carrier bars. Methods and apparatus for conveying small edible pieces are described in co-pending application Ser. No. 09/479,549, herein incorporated by reference.

While the present invention has been described with respect to what are presently considered to be the preferred embodiments, the invention is not to be limited to the disclosed embodiments. Rather, the present invention encompasses various modifications and equivalents included within the spirit and scope of the appended claims. The scope of the appended claims is to be accorded the broadest interpretation so as to encompass all such modifications and equivalent materials and functions.

What is claimed is:

1. A fat or wax-based ink-jettable edible ink for printing on an edible substrate, comprising:
   at least 0.09 percent by weight of a water-soluble FD&C dye colorant;
   a fat or wax dispersible carrier for the colorant in an amount effective to dissolve the colorant; and
   a fat or wax base, wherein the colorant is dissolved in the carrier prior to addition of the carrier to the fat or wax base;
   wherein the ink has a viscosity in a range of about 5 centipoise to about 20 centipoise and a surface tension of less than about 50 dynes per centimeter at the conditions under which the ink is ejected from a piezojet printhead.

2. The edible ink according to claim 1, wherein the carrier comprises a polyol.

3. The edible ink according to claim 1, wherein the fat or wax base is selected from the group consisting of candelilla wax, carnauba wax, beeswax, hydrogenated vegetable fats, milk fat, cocoa butter, edible fractions of mono-, di- and triglycerides, and vegetable oil and mixtures thereof, present in a range of about 30 percent by weight to about 80 percent by weight.

4. The edible ink according to claim 1, comprising a carnauba wax base, present in a range of about 30 percent by weight to about 80 percent by weight.

5. The edible ink according to claim 1, further comprising at least one component selected from the group consisting of surfactants, stabilizers, preservatives, antioxidants, antibloom agents, micronutrients, and proteinaceous materials.

6. The edible ink according to claim 1, wherein the colorant is an FD&C dye present at about the solubility limit of the FD&C dye in the carrier.

7. The edible ink of claim 1, wherein the ink is solid at 20° C. and upon heating to a temperature in a range of about 63° C. to about 180° C. obtains a viscosity of about 10 centipoise to about 15 centipoise such that the ink is ejectable through a piezojet ink-jet printhead.

8. The edible ink of claim 1, wherein the ink makes a contact angle of less than about 50 degrees with a wax polished hydrophobic confectionery surface at the conditions under which the ink is applied to the edible substrate.

9. A fat or wax-based ink-jettable edible ink for printing on an edible substrate, comprising:
   at least 0.09 percent by weight of a water-soluble FD&C dye colorant;
   a fat or wax dispersible carrier for the colorant in an amount effective to dissolve the colorant; and
   a fat or wax base, wherein the colorant is dissolved in the carrier prior to addition of the carrier to the fat or wax base;
   wherein the ink makes a contact angle of less than about 50 degrees with a wax-polished confectionery surface at the conditions under which the ink is applied to the edible substrate.

10. A method of ink-jet printing on edible substrates comprising the steps of:
    positioning an edible substrate proximate a piezojet ink-jet printhead having at least one ink reservoir;
    supplying to said ink reservoir an edible ink comprising: at least about 0.09 percent by weight of a water-soluble FD&C dye colorant; a fat or wax dispersible carrier for the colorant in an amount effective to dissolve the colorant; and a fat or wax base; wherein the colorant is dissolved in the carrier prior to addition of the carrier to the fat or wax base;

selecting the carrier for the colorant and the fat or wax so that the ink has a viscosity in a range of about 5 centipoise to about 20 centipoise and a surface tension of less than about 50 dynes per centimeter at the conditions under which the ink is ejected from the piezojet printhead; and ejecting droplets of the edible ink from the piezojet printhead onto a surface of the edible substrate in accordance with data signals to form an image having a resolution greater than 100 dpi and comprising individual solidified droplets of the ink.

11. The method according to claim 10, wherein the edible ink is ejected from the piezojet ink-jet printhead at a temperature in a range of about 63° C. to about 180° C.

12. The method according to claim 10, wherein the ink forms a contact angle of less than about 50 degrees on the edible substrate.

13. The method according to claim 10, wherein the edible substrate is confectionery.

14. The method according to claim 10, comprising the step of positioning the piezojet ink-jet printhead at an angle with respect to a moving direction of the edible substrate, and providing image data to the piezojet ink-jet printhead to compensate for the angle made by the printhead with respect to the moving direction of the edible substrate, such that image resolution is enhanced.

15. The method according to claim 10, comprising the step of heating the ink in the ink jet printhead to obtain a viscosity in the range of about 7 centipoise to about 15 centipoise and a surface tension below about 50 dynes/cm such that droplets of the ink can be ejected to form a high resolution image on the edible substrate.

16. The method according to claim 10, wherein the step of positioning the edible piece comprises:
  providing a conveyor having multiple pockets sized to accept a confectionery piece,
  fixing the position of the pieces in the pockets with vacuum or a trapping member, and
  serially transporting the confectionery pieces past a piezojet ink jet printhead.

17. The method according to claim 10, wherein the image is formed having a resolution greater than 150 dpi.

18. The method according to claim 10, wherein the image is formed having a resolution of about 300 dpi to about 800 dpi.

19. An edible product made by the method of claim 17, wherein the edible substrate is confectionery.

20. An edible product made by the method of claim 17, wherein the edible substrate is a confectionery piece having a non-planar hydrophobic surface.

21. The edible product according to claim 20, wherein the hydrophobic surface is a sugar shell polished with wax or fat.

22. An edible product comprising:
  an edible substrate selected from the group consisting of confectionery, baked goods, biscuits, cakes, cookies, nuts, chocolates, cheeses, crackers, chips, pastries, puddings, mousses, ice creams, creams, pet foods, pet treats, main meal snacks, cereals, and pharmaceutical tablets, and
  an ink-jetted image on the substrate having a resolution of greater than 300 dpi and comprising individual droplets of solidified edible ink; and wherein
  at least one of said individual droplets comprises a fat or wax-based edible ink-jettable ink which comprises at least about 0.09 percent by weight of a water-soluble FD&C dye colorant, a fat or wax dispersible carrier for the colorant in an amount effective to dissolve the colorant, and a fat or wax base, wherein the colorant is dissolved in the carrier prior to addition of the carrier to the fat or wax base.

23. A fat or wax-based ink-jettable edible ink for printing on an edible substrate, comprising:
  at least about 0.09 percent by weight of a water-soluble FD&C dye colorant;
  a fat or wax dispersible carrier for the colorant comprising glycerol, propylene glycol or a mixture thereof in an amount effective to dissolve the colorant; and
  a fat or wax base, wherein the colorant is dissolved in the carrier prior to addition of the carrier to the fat or wax base.

24. A fat or wax-based ink-jettable edible ink for printing on an edible substrate, comprising:
  at least about 0.09 percent by weight of a water-soluble FD&C dye colorant;
  a fat or wax dispersible carrier for the colorant in an amount effective to dissolve the colorant; and
  a fat or wax base, wherein the colorant is dissolved in the carrier prior to addition of the carrier to the fat or wax base;
  wherein the ink has a surface tension below about 50 dynes/cm at the conditions under which the ink is ejected from the printhead.

25. A method of ink jet printing on edible substrates comprising the steps of:
  positioning an edible substrate proximate a piezojet ink-jet printhead having at least one ink reservoir;
  supplying to said ink reservoir an edible ink comprising: at least about 0.09 percent by weight of a water-soluble FD&C dye colorant, a fat or wax dispersible carrier for the colorant in an amount effective to dissolve the colorant, and a fat or wax base; wherein the colorant is dissolved in the carrier prior to addition of the carrier to the fat or wax base; and
  ejecting droplets of the edible ink from a piezojet printhead onto a surface of the edible substrate in accordance with data signals to form an image having a resolution greater than 300 dpi and comprising individual solidified droplets of the ink.

26. A method of ink-jet printing on edible substrates comprising the steps of:
  positioning lenticular shaped confectionery pieces having a hydrophobic polished sugar shell coating with a non-planar surface in individual pockets on a conveyor and serially conveying the pieces past a stationary piezojet ink-jet printhead having at least one ink reservoir;
  supplying to said ink reservoir an edible ink comprising: at least about 0.09 percent by weight of a water-soluble FD&C dye colorant, a fat or wax dispersible carrier for the colorant in an amount effective to dissolve the colorant, and a fat or wax base; wherein the colorant is dissolved in the carrier prior to addition of the carrier to the fat or wax base; and
  ejecting droplets of the edible ink from a piezojet printhead onto a surface of the edible substrate in accordance with data signals to form an image having a resolution greater than 100 dpi and comprising individual solidified droplets of the ink.

* * * * *